(12) United States Patent
Zhang et al.

(10) Patent No.: US 10,173,399 B2
(45) Date of Patent: Jan. 8, 2019

(54) ANTI-YELLOWING COMPOSITION, RESIN COMPOSITION, METAL-RESIN COMPOSITE AND PREPARATION METHOD AND USE THEREOF, AND ELECTRONIC PRODUCT SHELL

(71) Applicant: BYD COMPANY LIMITED, Shenzhen, Guangdong (CN)

(72) Inventors: Xiong Zhang, Shenzhen (CN); Shouping Bai, Shenzhen (CN); Qianrong Zhang, Shenzhen (CN); Wei Zhou, Shenzhen (CN); Qing Gong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 15/633,009

(22) Filed: Jun. 26, 2017

(65) Prior Publication Data
US 2017/0305123 A1    Oct. 26, 2017

Related U.S. Application Data

(63) Continuation of application No. PCT/CN2015/092727, filed on Oct. 23, 2015.

(30) Foreign Application Priority Data

Dec. 26, 2014   (CN) .......................... 2014 1 0830162

(51) Int. Cl.
*B32B 27/06*   (2006.01)
*B32B 15/08*   (2006.01)
(Continued)

(52) U.S. Cl.
CPC .............. *B32B 27/06* (2013.01); *B32B 15/08* (2013.01); *C08K 3/32* (2013.01); *C08K 5/103* (2013.01);
(Continued)

(58) Field of Classification Search
CPC .......... B32B 15/08; B32B 27/06; C08K 3/32; C08K 5/372; C08K 5/523; C08K 13/02;
(Continued)

(56) References Cited

U.S. PATENT DOCUMENTS

| 6,790,886 B2 | 9/2004 | Harashina et al. |
| 2012/0214914 A1 | 8/2012 | Bell et al. |
| 2014/0308532 A1 | 10/2014 | Elliott et al. |

FOREIGN PATENT DOCUMENTS

| CN | 1995142 A | 7/2007 |
| CN | 102492268 A | 6/2012 |

(Continued)

OTHER PUBLICATIONS

International Search Report and Written Opinion for Application No. PCT/CN2015/092727, dated Feb. 1, 2016, 13 pages.

*Primary Examiner* — William K Cheung
(74) *Attorney, Agent, or Firm* — Sheppard Mullin Richter & Hampton LLP

(57) ABSTRACT

The present disclosure discloses an anti-yellowing composition comprising at least a phosphorus-containing compound and at least a pentaerythritol ester, wherein the phosphorus-containing compound is selected from a phosphate salt, and a concentration of the phosphorus-containing compound is 100-1600 parts by weight, relative to 100 parts by weight of the pentaerythritol ester. The present disclosure also discloses a resin composition containing the anti-yellowing composition, and a metal-resin composite formed with the resin composition and a metal substrate, and a preparation method and use thereof. The present disclosure further discloses an electronic product shell formed with the resin composition and a metal shell body.

18 Claims, 1 Drawing Sheet

(51) Int. Cl.
  *C08K 3/32*    (2006.01)
  *C08K 5/372*   (2006.01)
  *C08K 7/14*    (2006.01)
  *C08K 13/02*   (2006.01)
  *C08L 23/08*   (2006.01)
  *C08L 23/26*   (2006.01)
  *C08L 67/02*   (2006.01)
  *C08L 71/12*   (2006.01)
  *C08L 81/02*   (2006.01)
  *C08K 5/103*   (2006.01)
  *C08K 5/523*   (2006.01)
  *C08K 5/00*    (2006.01)

(52) U.S. Cl.
  CPC .............. *C08K 5/372* (2013.01); *C08K 5/523* (2013.01); *C08K 7/14* (2013.01); *C08K 13/02* (2013.01); *C08L 23/08* (2013.01); *C08L 23/26* (2013.01); *C08L 67/02* (2013.01); *C08L 71/12* (2013.01); *C08L 81/02* (2013.01); *C08K 5/005* (2013.01); *C08K 2003/324* (2013.01)

(58) Field of Classification Search
  CPC . C08K 7/14; C08L 81/02; C08L 23/08; C08L 23/26; C08L 67/02; C08L 71/12
  USPC ......................................................... 524/849
  See application file for complete search history.

(56) References Cited

FOREIGN PATENT DOCUMENTS

| | | | |
|---|---|---|---|
| CN | 102627849 A | | 8/2012 |
| CN | 103391915 A | | 11/2013 |
| CN | 103923394 A | | 7/2014 |
| CN | 104004348 A | | 8/2014 |
| CN | 104403314 A | | 3/2015 |
| EP | 0184191 | * | 6/1986 |
| EP | 0184191 A1 | | 6/1986 |
| WO | 01/48086 A1 | | 7/2001 |

\* cited by examiner

ANTI-YELLOWING COMPOSITION, RESIN COMPOSITION, METAL-RESIN COMPOSITE AND PREPARATION METHOD AND USE THEREOF, AND ELECTRONIC PRODUCT SHELL

CROSS REFERENCE TO RELATED APPLICATIONS

This application is a continuation application of International Application No. PCT/CN2015/092727, filed on Oct. 23, 2015, which is based on and claims priority to and benefits of Chinese Patent Application No. 201410830162.8, filed with the State Intellectual Property Office (SIPO) of the People's Republic of China on Dec. 26, 2014. The entire contents of the above-identified applications are incorporated herein by reference.

TECHNICAL FIELD

The present disclosure relates to an anti-yellowing composition, and particularly to a resin composition comprising the anti-yellowing composition, a metal-resin composite formed with the resin composition and a metal, a preparation method and use thereof, and an electronic product shell using the resin composition.

BACKGROUND

In an existing process for preparing a metal-resin composite, an antioxidant is generally added to a resin composition for forming a resin layer, for example, a hindered phenol type antioxidant (such as antioxidant 1010: pentaerythritol tetrakis[3-(3,5-di-t-butyl-4-hydroxyphenyl)propionate]) and/or an organic phosphite type antioxidant. However, with an elapse of usage time, the resin layer is still prone to yellow, which adversely affects appearances of products using the composite, and also makes the resin layer brittle, resulting in reduced mechanical properties of the composite, and shortened service life of products.

Therefore, the metal-resin composite and the preparation thereof still need to be further improved.

SUMMARY

An objective of the present disclosure is to overcome the technical problem that the resin layer in an existing metal-resin composite is prone to yellow during usage, which affects appearances and mechanical performances of products.

Extensive studies have been conducted on the above problem and find that using a pentaerythritol ester type antioxidant and an inorganic phosphate salt in combination can effectively inhibit the yellowing of the resin layer in a metal-resin composite.

According to a first aspect of the present disclosure, the present disclosure provides an anti-yellowing composition, which comprises at least a phosphorus-containing compound and at least a pentaerythritol ester. The phosphorus-containing compound is selected from a phosphate salt, and a concentration of the phosphorus-containing compound is 100-1600 parts by weight, relative to 100 parts by weight of the pentaerythritol ester.

According to a second aspect of the present disclosure, the present disclosure provides a resin composition, which comprises a base resin and an anti-yellowing agent, where the anti-yellowing agent is an anti-yellowing composition according to the present disclosure.

According to a third aspect of the present disclosure, a metal-resin composite is provided, which comprises a metal substrate and a resin layer attached to at least a part of a surface of the metal substrate, where the resin layer is formed with the resin composition according to the present disclosure.

According to a fourth aspect of the present disclosure, a method for preparing a metal-resin composite is provided, which comprises mixing a resin composition according to the present disclosure until uniform, injecting the resulting mixture onto a surface of a metal substrate, and molding to form a resin layer on the surface of the metal substrate.

According to a fifth aspect of the present disclosure, the present disclosure provides a usage of a metal-resin composite according to the present disclosure or a metal-resin composite prepared by the method of the present disclosure in a preparation of an electronic product shell.

According to a sixth aspect of the present disclosure, the present disclosure provides an electronic product shell, which comprises a metal shell body and at least one resin member attached to at least a part of an inner surface and/or at least a part of an outer surface of the metal shell body, where the resin member is formed with the resin composition according to the present disclosure.

In the anti-yellowing composition according to the present disclosure, an inorganic phosphate salt is used in combination with a pentaerythritol ester commonly used as an antioxidant, and the combination exhibits a better anti-yellowing effect and can more effectively inhibit an occurrence of yellowing of the resin, compared with a pentaerythritol ester type antioxidant used alone or in combination with an organic phosphite commonly used as an antioxidant.

When used in a resin composition for preparing a metal-resin composite, the anti-yellowing composition according to the present disclosure can effectively inhibit the occurrence of yellowing of the resin layer in the composite during usage, whereby products using the composite will not suffer from degrading appearance and mechanical performances due to the yellowing of the resin layer.

The metal-resin composite formed with the resin composition containing the anti-yellowing composition according to the present disclosure and a metal substrate is particularly suitable for preparations of electronic product shells, such as a mobile phone shell.

DETAILED DESCRIPTION

Figure 1:
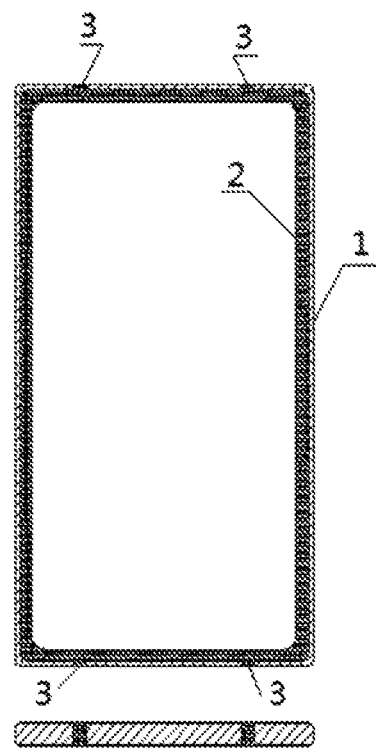
FIG. 1 is cross-sectional views including a front view and a top view that schematically illustrate a mobile phone shell according to the present disclosure.

The present disclosure provides an anti-yellowing composition, which comprises at least a phosphorus-containing compound and at least a pentaerythritol ester.

In the anti-yellowing composition according to the present disclosure, the pentaerythritol ester refers to a compound formed through a condensation reaction of a carboxylic acid with pentaerythritol. The pentaerythritol ester may be a variety of pentaerythritol esters commonly used as an anti-oxidant, that is, the pentaerythritol ester may be selected from pentaerythritol ester type antioxidants. Particularly, the pentaerythritol ester may be one or two or more of pentaerythritol tetrakis-[β-dodecyl thiopropionate], pentaerythritol tetrakis[3-(3,5-di-t-butyl-4-hydroxyphenyl)propionate], distearyl pentaerythritol diphosphite, and bis(2,6-di-t-butyl-4-methylphenyl)pentaerythritol diphosphate.

Optionally, the pentaerythritol ester is a sulfur-containing pentaerythritol ester, so as to obtain a better anti-yellowing effect. Optionally, the pentaerythritol ester is pentaerythritol tetrakis-[β-dodecyl thiopropionate].

In the anti-yellowing composition according to the present disclosure, the phosphorus-containing compound is selected from a phosphate salt.

The phosphate salt refers to a compound formed by replacing at least one hydrogen atom in phosphoric acid by an inorganic group. Optionally, the phosphate salt is a compound of Formula I:

  (Formula I)

where in Formula I, M is an alkali metal or an alkaline earth metal atom, x is an integer from 1 to 3, y is an integer from 0 to 2, and x+y=3.

In Formula I, M is specifically Na, K or Mg, for example, Na.

The phosphate salt may be, for example, one or two or more of sodium dihydrogen phosphate, disodium hydrogen phosphate, and trisodium phosphate.

In a specific embodiment of the present disclosure, the pentaerythritol ester is a sulfur-containing pentaerythritol ester, for example, pentaerythritol tetrakis-[β-dodecyl thiopropionate]; and the phosphorus-containing compound is a sodium salt of phosphoric acid, for example, sodium dihydrogen phosphate.

In the anti-yellowing composition according to the present disclosure, the concentration of the phosphorus-containing compound is 100-1600 parts by weight, relative to 100 parts by weight of the pentaerythritol ester. For the purpose of further improving the anti-yellowing performance of the anti-yellowing composition according to the present disclosure, the concentration of the phosphorus-containing compound may be, for example, 400-1600 parts by weight relative to 100 parts by weight of the pentaerythritol ester. In the present disclosure, when a numerical range is described, both end values are inclusive.

The anti-yellowing composition according to the present disclosure is useful as an anti-yellowing agent for various polymers, to prevent occurrences of yellowing during usages of products prepared therefrom.

The present disclosure further provides a resin composition, which comprises a base resin and an anti-yellowing agent, where the anti-yellowing agent is an anti-yellowing composition according to the present disclosure. The species and concentrations of the components in the anti-yellowing composition have been described in detail above, and thus are not elaborated here again.

In the resin composition according to the present disclosure, the concentration of the anti-yellowing agent relative to 100 parts by weight of the base resin is such that a desirable anti-yellowing performance can be achieved. Generally, the concentration of the anti-yellowing agent may be 0.1-5 parts by weight, for example, 0.5-3 wt %, for example, 1.5-2.5 wt %, relative to 100 parts by weight of the base resin.

The base resin may be determined according to specific usage scenarios of the resin composition, and may be a thermoplastic resin or a thermosetting resin. The base resin may be a plastic or a rubber. Specific examples of the base resin include, but are not limited to, one or two or more of polyolefins (such as polystyrene, polypropylene, polymethyl methacrylate and poly(acrylonitrile-butadiene-styrene)), polycarbonates, polyesters (such as poly(cyclohexylene dimethylene terephthalate), poly(diallyl isophthalate), poly (diallyl terephthalate), polybutylene naphthalate, polyethylene terephthalate, and polybutylene terephthalate), polyamides (such as poly(hexamethylene adipamide), poly (nonamethylene adipamide), poly(tetramethylene adipamide), poly(hexamethylene dodecanamide), poly(hexamethylene sebacamide), poly(decamethylene sebacamide), polyundecamide, polydodecamide, polyoctanamide, poly(9-aminononanoic acid), polycaprolactam, poly(p-phenylene terephthalamide), poly(hexamethylene isophthalamide), poly(hexamethylene terephthalamide), and poly(nonamethylene terephthalamide)), polyarylene ethers, polyetherimides, polycarbonate/(acrylonitrile-butadiene-styrene) alloys, polyphenylene ethers, polyphenylene sulfides, polyimides, polysulfones, polyether ether ketone, polybenzimidazole, phenolic resins, urea-formaldehyde resins, melamine-formaldehyde resin, epoxy resin, alkyd resin and polyurethane.

Optionally, the base resin is one or two or more of polyarylene sulfide resins, polyether resins, and polyester resins. A resin composition containing the base resin is particularly suitable for integratedly bonding to a metal substrate, to form a metal-resin composite having high mechanical performances, and is useful as a structured member. The polyester resin refers to a polymer containing an ester group (that is,

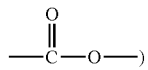

in its molecular structure. Specific examples of the base resin include, but are not limited to, one or two or more of polyphenylene sulfide, polyphenylene ether, polycarbonate, poly(cyclohexylene dimethylene terephthalate), poly(diallyl isophthalate), poly(diallyl terephthalate), polybutylene naphthalate, polyethylene terephthalate, and polybutylene terephthalate. For the purpose of further increasing the bond strength between the metal substrate and the resin layer in the metal-resin composite formed with the resin composition, the base resin is selected from a polyphenylene sulfide, a polyphenylene ether, and a polyalkylene terephthalate. The polyalkylene terephthalate may be, for example, polybutylene terephthalate and/or polyethylene terephthalate.

In the resin composition according to the present disclosure, the base resin is a partially crystallized polymer having a crystallization temperature and a glass transition temperature. The crystallization temperature of the base resin depends on the species and molecular weight of the base resin. In the resin composition according to the present disclosure, for example, a resin having a crystallization temperature ranging from 100 to 150° C., for example, a resin having a crystallization temperature ranging from 110 to 130° C. may be used as the base resin. In the resin composition according to the present disclosure, the glass transition temperature of the base resin is generally at least 30° C. lower than its crystallization temperature.

In the resin composition according to the present disclosure, at least a bond force enhancing resin is further contained, the incipient melting temperature of which is not higher than the crystallization temperature of the base resin. In the resin composition according to the present disclosure, the bond strength between the metal substrate and the resin layer in the metal-resin composite formed with the resin composition and the metal can be further improved by introducing the bond force enhancing resin. Optionally, the incipient melting temperature of the bond force enhancing resin is 10-20° C. lower than the crystallization temperature of the base resin. Optionally, the incipient melting temperature of the bond force enhancing resin is 15-20° C. lower than the crystallization temperature of the base resin.

In the present disclosure, the incipient melting temperature and the crystallization temperature are determined following a method specified in ASTM D3418-08, in which an extrapolated incipient melting temperature is taken as the incipient melting temperature, and a crystallization peak temperature is taken as the crystallization temperature.

For the purpose of further enhancing the bond strength between the metal substrate and the resin layer in the metal-resin composite formed with the resin composition and the metal substrate, the bond force enhancing resin may be, for example, a polyolefin having a structural unit containing a maleic anhydride group.

In the polyolefin useful as the bond force enhancing resin, the concentration of the structural unit containing a maleic anhydride group may be 0.5-2 wt %. Optionally, in the polyolefin useful as the bond force enhancing resin, the concentration of the structural unit containing a maleic anhydride group is 1-1.5 wt %, so as to further improve the bond strength of the composite formed with the resin composition and the metal substrate. The concentration of the structural unit containing a maleic anhydride group can be determined by acid-base titration.

The structural unit containing a maleic anhydride group may be formed by maleic anhydride, that is, the polyolefin useful as the bond force enhancing resin has a structural unit formed by maleic anhydride.

The polyolefin useful as the bond force enhancing resin further has a structural unit formed by an olefin (e.g. a $C_2$-$C_4$ monoolefin), for example, a structural unit formed by ethylene.

In a specific embodiment of the present disclosure, the structural units of the polyolefin useful as the bond force enhancing resin include a structural unit formed by maleic anhydride and a structural unit formed by ethylene.

The polyolefin useful as the bond force enhancing resin may be a random copolymer, a block copolymer, or an alternating copolymer, for example, a random copolymer.

The polyolefin useful as the bond force enhancing resin may be commercially available or synthesized through a conventional process by, for example, copolymerizing an olefin (e.g. ethylene) with maleic anhydride.

In the resin composition according to the present disclosure, the concentration of the bond force enhancing resin may be 1-5 parts by weight, relative to 100 parts by weight of the base resin. For the purpose of further enhancing the bond strength between the metal substrate and the resin layer in the metal-resin composite formed with the resin composition, the concentration of the bond force enhancing resin may be, for example, 1-4 parts by weight, relative to 100 parts by weight of the base resin.

In the resin composition according to the present disclosure, at least a fiber may be further contained, depending on specific usage scenarios. In this way, the mechanical strength of a structured member formed with the resin composition can be improved. The fiber may be a common fiber material. Specifically, the fiber may be selected from glass fibers, carbon fibers, and polyamide fibers.

In the resin composition according to the present disclosure, the fiber concentration may be determined according to a particular usage scenario of the resin composition. Generally, the fiber concentration may be 10-60 parts by weight, for example, 30-50 parts by weight, relative to 100 parts by weight of the base resin.

In the resin composition according to the present disclosure, at least a modified resin is further optionally contained. The modified resin has a melting point that is 3-24° C. higher than the glass transition temperature of the base resin, such that the resin layer in the metal-resin composite formed with the resin composition and the metal substrate by integration molding not only has a good impact resistance, but also exhibits a low dielectric constant and a low dielectric loss. On the premise that the resin layer formed with the resin composition has a good impact resistance, the modified resin may have a melting point that is, for example, 10-20° C. higher than the glass transition temperature of the base resin, for the purpose of further reducing the dielectric constant and the dielectric loss of the resin layer. Optionally, the modified resin has a melting point that is 14-18° C. higher than the glass transition temperature of the base resin. In the resin composition according to the present disclosure, the melting point of the modified resin is generally lower than that of the bond force enhancing resin.

In the present disclosure, the glass transition temperature is determined following a method specified in ASTM D3418-08, in which a midpoint temperature is taken as the glass transition temperature.

For the purpose of further enhancing the impact resistance of the resin layer formed with the resin composition, the modified resin is a polyolefin having an epoxy group-containing structural unit. The epoxy group may be an end group of a polyolefin molecular chain, or may be present at a side chain of the polyolefin molecular chain. Optionally, the epoxy group is present at a side chain of the polyolefin molecular chain.

In a specific embodiment, the modified resin has an epoxy group-containing structural unit of Formula II:

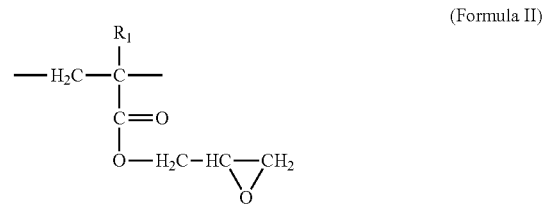

(Formula II)

where in Formula II, $R_1$ is hydrogen or $C_1$-$C_5$ alkyl. The $C_1$-$C_5$ alkyl includes a linear $C_1$-$C_5$ alkyl group and a branched $C_3$-$C_5$ alkyl. Specific examples include, but are not limited to, methyl, ethyl, n-propyl, isopropyl, n-butyl, 2,2-dimethylethyl, 2-methylpropyl, n-pentyl, 2-methylbutyl, 3-methylbutyl, 4-methylbutyl, 2,2-dimethylpropyl, 2,3-dimethylpropyl, 2-ethylpropyl, and 3-ethylpropyl.

Optionally, the modified resin has an epoxy group-containing structural unit of Formula III:

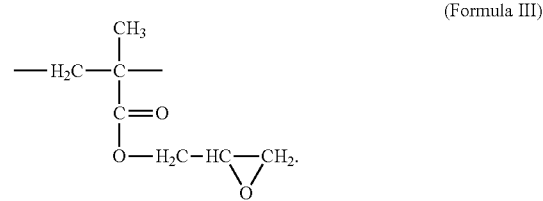

(Formula III)

In the resin composition according to the present disclosure, the modified resin further has a structural unit formed from an olefin (e.g. a $C_2$-$C_4$ monoolefin), optionally a structural unit formed by ethylene.

In a specific embodiment of the present disclosure, the structural units of the modified resin include a structural unit formed from ethylene and a structural unit of Formula III.

In the resin composition according to the present disclosure, the polyolefin useful as the modified resin may be a random copolymer, a block copolymer, or an alternating copolymer. Optionally, the polyolefin useful as the modified resin is a random copolymer.

In the resin composition according to the present disclosure, the concentration of the epoxy group-containing structural unit in the modified resin may be, for example, 1-8 wt %, for example 2-4 wt %, for the purpose of further enhancing the impact resistance of the metal-resin composite formed with the resin composition and the metal substrate.

The modified resin may be commercially available or synthesized through a conventional process, by for example, copolymerizing an olefin with an olefinic monomer containing an epoxy group in its molecular structure. Specific examples of the olefinic monomer include, but are not limited to, glycidyl methacrylate.

In the resin composition according to the present disclosure, the concentration of the modified resin may be 1-10 parts by weight, relative to 100 parts by weight of the base resin. For the purpose of further enhancing the impact strength of the resin layer formed with the resin composition and further reducing the dielectric constant and the dielectric loss of the resin layer formed with the resin composition, the concentration of the modified resin may be, for example, 4-8.5 parts by weight, relative to 100 parts by weight of the base resin.

In the resin composition according to the present disclosure, at least an additive is further contained, depending on a particular usage scenario, for example, a photo stabilizer, and a lubricant, to improve the performance of the resin composition and/or impart a new performance to the resin composition.

The photo stabilizer may be various generally known photo stabilizers, for example, a hindered amine type photo stabilizer. Specific examples may include, but are not limited to bis(2,2,6,6-tetramethyl-4-piperidinyl) sebacate. The amount of the photo stabilizer may be 0.01-5 parts by weight, for example, 0.1-1 parts by weight, relative to 100 parts by weight of the base resin.

The lubricant may be various substances capable of improving the fluidity of a polymer melt, for example, one or two or more selected from ethylene/vinyl acetate copolymer wax (EVA wax), polyethylene wax (PE wax), a stearate, and silicone. The concentration of the lubricant may be 0.1-5 parts by weight, for example, 0.5-2 parts by weight, relative to 100 parts by weight of the base resin.

The resin composition according to the present disclosure is particularly suitable to bond to a metal substrate, to form a metal-resin composite having an excellent anti-yellowing performance that is particularly useful as an electronic product shell.

The present disclosure further provides a metal-resin composite, which comprises a metal substrate and a resin layer attached to at least a part of a surface of the metal substrate, where the resin layer is formed with the resin composition according to the present disclosure. The species and concentrations of various components in the resin composition have been described in detail above, and thus are not elaborated here again.

The bond force between the metal substrate and the resin layer in the metal-resin composite according to the present disclosure can be enhanced by various methods commonly used in the art. Optionally, holes and/or grooves may be distributed on a surface of the metal substrate to which the resin layer is attached, and a part of the resin in the resin layer extends to fill in the holes and/or grooves, thus anchoring the resin layer into the metal substrate. A method for forming holes and/or grooves on the surface of the metal substrate will be described in detail below, and no description is given here.

In the metal-resin composite according to the present disclosure, the thickness of the resin layer can be determined according to particular usage scenarios of the metal-resin composite. Generally, the thickness of the resin layer is 0.3-2 mm.

In the metal-resin composite according to the present disclosure, the material of the metal substrate can be determined according to particular usage scenarios of the metal-resin composite. Generally, the material of the metal substrate may be aluminum, aluminum alloys, magnesium, magnesium alloys, or stainless steel.

The present disclosure further provides a method for preparing a metal-resin composite, which comprises mixing a resin composition according to the present disclosure until uniform, injecting the resulting mixture onto a surface of a metal substrate, and molding to form a resin layer on the surface of the metal substrate. The species and concentrations of various components in the resin composition have been described in detail above, and thus are not elaborated here again.

The components in the resin composition according to the present disclosure can be uniformly mixed through various processes. For example, the components of the resin composition according to the present disclosure are uniformly mixed in a twin screw extruder and then granulated.

The resulting mixture is injected onto the surface of the metal substrate by a conventional method, and then molded, thereby forming a resin layer on the surface of the metal substrate. In a specific embodiment of the present disclosure, the metal substrate is positioned in a mold, and a mixture of the resin composition is injected by means of injection molding.

The injection molding conditions may be conventional. Optionally, the injection molding conditions include: molding temperature 100-160° C., holding time 1-60 seconds, injection pressure 50-140 MPa, injection time 0.2-3 seconds, and delay time 1-60 seconds.

The injection volume of the resin composition can be determined according to a desired thickness of the resin layer. Generally, the injection volume of the resin composition is such that the thickness of the formed resin layer is 0.3-2 mm.

According to the method of the present disclosure, for example, holes and/or grooves are formed in advance on a surface of the metal substrate, for the purpose of further enhancing the bond strength between the metal substrate and the resin layer in the ultimately formed metal-resin composite. The holes and/or grooves may be formed on the surface of the metal substrate through various processes commonly used.

In an embodiment, the metal substrate may be anodized, to form an anodized film layer on the surface of the metal substrate. Pores are distributed in the anodized film layer, and a part of the resin composition is filled in the pores of the anodized film layer when the resin composition is injected onto the surface of the metal substrate. The method for anodizing the metal substrate is well known to those skilled in the art, and not elaborated herein again.

In another embodiment, the metal substrate may be positioned in an etching solution, to form corrosion holes on the surface of the metal. The type of the etching solution is not particularly limited, and may be determined according to the material of the metal substrate. The corrosion holes formed generally have a diameter ranging from 100 to 2000 nm. The depth of the corrosion holes may be 10-50% of the thickness of the metal substrate.

The two implementations may also be used in combination.

The resin layer in the metal-resin composite according to the present disclosure has an excellent anti-yellowing performance and is particularly suitable for use in a preparation of an electronic product shell, for example, a mobile phone shell.

The present disclosure further provides an electronic product shell, which comprises a metal shell body and at least one resin member attached to at least a part of an inner surface and/or at least a part of an outer surface of the metal shell body, where the resin member is formed with the resin composition according to the present disclosure. In the present disclosure, the shell includes not only a shell having a sheet-like structure, and also a variety of frame structures, such as outer frames.

In the electronic product shell according to the present disclosure, at least one cutout is provided on the metal shell body as desired, to fit an element of an electronic product that needs to be kept away from the metal shell body at a position corresponding the cutout. In an embodiment, as the metal has a shielding effect on electromagnetic signals, the position of the cutout at least partially corresponds to a position at which a signal transmitting element and/or a signal receiving element is fitted. At this time, a resin member may be, for example, provided at the position of the cutout in such a manner that a part of the resin in the resin member is filled in the cutout. The signal transmitting element and/or the signal receiving element may be fitted on the resin member.

In the electronic product shell according to the present disclosure, the metal shell body may have a unitary structure or a spliced structure. The spliced structure means that the metal shell body includes at least two separate portions, which are spliced together to form the metal shell body.

When the metal shell body has a spliced structure, the adjacent two portions may be bonded together by an adhesive. In a specific embodiment, the adjacent two portions are spliced at the position where the resin member is provided. The resin member is lap joined to the adjacent two portions respectively and covers the splicing position (that is, the adjacent two portions are bridged by the resin member), thereby increasing the bond strength at the splicing position. Moreover, the metal shell body may be divided into multiple portions based on an internal structure of the electronic product, and the resin member functions to integrate the metal shell body, and serves as a base for mounting some electronic elements as well.

In the electronic product shell according to the present disclosure, the resin member is attached to at least a part of the outer surface of the metal shell body, and the resin member may cover the entire or a part of the outer surface of the metal shell body, to form a pattern, for example, a decorative pattern.

In the electronic product shell according to the present disclosure, when the resin member is attached to the inner surface of the metal shell body, the resin member may be provided at one or more positions desired. In a specific embodiment, the resin member is attached to the entire inner surface of the metal shell body. In this case, the resin member may, for example, have a unitary structure. This specific embodiment is particularly applicable to a scenario where the metal shell body has a spliced structure.

The electronic product shell according to the present disclosure may be a shell of any electronic products that need a metal shell, for example, a shell or frame of a mobile terminal, or a shell or frame of a wearable electronic device. The mobile terminal refers to a device that is movable and has wireless transmission capabilities, such as a mobile phone, a portable computer (including a laptop and a tablet). The wearable electronic device is a wearable smart device, such as a smart watch, and a smart bracelet. The electronic product may be specifically, but is not limited to, one or two or more of a mobile phone, a portable computer (including a laptop and a tablet), a smart watch, and a smart bracelet.

FIG. 1 shows a front view and a top view of an embodiment in which the electronic product shell is a mobile phone shell. As shown in FIG. 1, multiple cutouts 3 are opened on a metal shell body 1 of a mobile phone at positions corresponding to the positions where an antenna and various keys are mounted. A resin layer 2 is attached to an entire inner surface of the metal shell body 1 of the mobile phone. The resin layer 2 has a unitary structure and a part of the resin in the resin layer 2 is filled in the cutouts 3.

Figure 2:
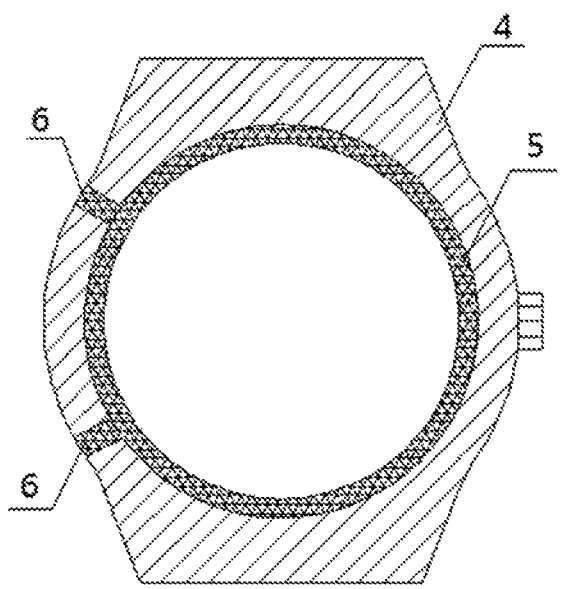
FIG. 2 is a cross-sectional view schematically illustrating a smart watch shell according to the present disclosure.

FIG. 2 shows a front view of an embodiment in which the electronic product shell is a smart watch shell. As shown in FIG. 2, signal element cutouts 6 are provided on a metal shell body 4 of a smart watch at positions corresponding to the positions where the signal transmitting element and/or the signal receiving element are mounted. A resin lining layer 5 is attached to an inner surface of the metal shell body 4 of the smart watch, and a part of the resin in the resin lining layer 5 is filled in the signal element cutouts 6. Signal elements can be mounted at corresponding positions on the resin lining layer 5.

The electronic product shell may be prepared by the method for preparing a metal-resin composite as described above, which is not elaborated here again.

The electronic product shell according to the present disclosure has a good anti-yellowing performance and can effectively inhibit an occurrence of yellowing of the resin layer.

Hereinafter, the present disclosure will be described in detail by way of examples; however, the scope of the present disclosure is not limited thereto.

In the following examples and comparative examples, the glass transition temperature, the melting point, the incipient melting temperature, and the crystallization temperature are determined following the methods as specified in ASTM D3418-08, in which a midpoint temperature is taken as the glass transition temperature, a melting peak temperature is taken as the melting point, an extrapolated incipient melting temperature is taken as the incipient melting temperature, and a crystallization peak temperature is taken as the crystallization temperature.

In the following examples and comparative examples, the anti-yellowing performance of the resin layer in a metal-resin composite is determined by using a colorimeter. The determination method is specifically baking a specimen for 3 hrs at 180° C., determining chromaticities b of the resin layer before and after baking, and calculating the difference Δb between the chromaticity $b_2$ after backing and the chromaticity $b_1$ before backing. The lower the Δb value is, the better the anti-yellowing performance will be. Generally, Δb needs to be less than 1.

In the following examples and comparative examples, a tensile strength (tensile strength at break) of a specimen prepared with the resin composition is tested following the method specified in ASTM D638-2010, in which an I-shaped specimen is used.

In the following examples and comparative examples, an average shear strength between the metal substrate and the resin layer in the metal-resin composite is tested on INSTRON 3369 universal testing machine following the method specified in ASTM D1002-10, in which the metal substrate is lap joined to the resin layer at a site of 5 mm long×15 mm wide.

In the following examples and comparative examples, a notched Izod impact strength of a specimen prepared with the resin composition is tested following the method specified in ASTM D256-06, in which the test specimen has a size of 63.5 mm×12.7 mm×3.0 mm (the notch on the test specimen is 2.54 mm deep).

In the following examples and comparative examples, an ash concentration in the base resin is determined by burning in a muffle furnace, through a process comprising specifically transferring the base resin to a muffle furnace at 1000° C., burning for 4 hrs in an air atmosphere, collecting and weighing the burned residue, where the percentages by weight of the residue relative to the weight of the base resin before burning is taken as the ash concentration in the base resin.

In the following examples and comparative examples, corrosion holes on the surface of the etched metal substrate are observed under the model S-4800 electron microscope purchased from Hitachi, Ltd, Japan and then the inner diameter is determined.

The Present Disclosure is Described with Reference to Examples 1-8.

Example 1

(1) An A5052 aluminum alloy plate of 1.0 mm in thickness was cut into a rectangular plate of 100 mm long×15 mm wide, and then immersed for 1 min in a 1 wt % aqueous NaOH solution (where the solution temperature was 40° C.). The aluminum alloy plate was removed, washed 3 times with deionized water, and dried to obtain a metal substrate. The surface of the metal substrate was observed under an electron microscope, and determined that corrosion holes with an average inner diameter of 100 nm were distributed on the surface of the aluminum alloy plate.

(2) 61 parts by weight of a polyphenylene sulfide resin (PPS-Hc available from Sichuan Deyang Chemical Co., Ltd, in which the crystallization temperature is 125° C., and the glass transition temperature is 89° C.), 2 parts by weight of a bond force enhancing resin (GR209 available from Dow Chemical Company, in which the concentration of the structural unit formed by maleic anhydride is 1.5 wt %, the incipient melting temperature is 105° C., and the melting point is 115° C.), 5 parts by weight of a modified resin (Lotader AX8840 available from Arkema, which is a random copolymer of ethylene with glycidyl methacrylate, in which the concentration of the structural unit formed by glycidyl methacrylate is 4 wt %, and the melting point is 106° C.), and 1 part by weight of an anti-yellowing agent (containing sodium dihydrogen phosphate and pentaerythritol tetrakis-[β-dodecyl thiopropionate], in which relative to 100 parts by weight of pentaerythritol tetrakis-[β-dodecyl thiopropionate], the concentration of sodium dihydrogen phosphate is 1600 parts by weight) were mixed uniformly. Then 30 parts by weight of E glass fiber (988A available from Zhejiang Jushi Co., Ltd.) and 1 part by weight of silicone as a lubricant (available from Wacker Chemie, under the trademark GENIOPLAST) were added, mixed uniformly in a twin screw extruder and then granulated by extrusion, to obtain a granular material.

The granular material was injection molded, to obtain specimens that were used in the tensile test, the notched Izod impact test, the anti-yellowing test, and the dielectric performance test respectively, to determine the tensile strength, the notched Izod impact strength, the chromaticity, the dielectric constant, and the dielectric loss tangent. The result is shown in Table 1.

(3) A melt of the granular material obtained in Step (2) was injected onto the surface of the metal substrate obtained in Step (1) by an injection molding machine, and cooled to obtain a metal-resin composite, in which the molding temperature was 130° C., the nozzle temperature was 300° C., the holding time was 2 seconds, the injection pressure was 50 MPa, the injection time was 1 second, and the delay time was 5 seconds. The formed resin layer has a size of 100 mm long×15 mm wide×1 mm thick, the metal substrate is lap joined to the resin layer at a site of 5 mm long×15 mm wide. The performance data of the metal-resin composite is shown in Table 1.

Example 2

(1) A metal substrate was prepared through the same method as described in Step (1) of Example 1.

(2) A resin composition was prepared through the same method as described in Step (2) of Example 1, except that in the anti-yellowing agent, the pentaerythritol tetrakis-[β-dodecyl thiopropionate] was replaced by an equivalent amount of distearyl pentaerythritol diphosphite.

(3) A metal-resin composite was prepared through the same method as described in Step (3) of Example 1, except that the resin composition prepared in Step (2) of Example 2 was used. The performance data of the prepared metal-resin composite is shown in Table 1.

Example 3

(1) A metal substrate was prepared through the same method as described in Step (1) of Example 1.

(2) A resin composition was prepared through the same method as described in Step (2) of Example 1, except that in the anti-yellowing agent, the sodium dihydrogen phosphate was replaced with an equivalent amount of sodium phosphate.

(3) A metal-resin composite was prepared through the same method as described in Step (3) of Example 1, except that the resin composition prepared in Step (2) of Example 3 was used. The performance data of the prepared metal-resin composite is shown in Table 1.

Comparative Example 1

(1) A metal substrate was prepared through the same method as described in Step (1) of Example 1.

(2) A resin composition was prepared through the same method as described in Step (2) of Example 1, except that in the anti-yellowing agent, no sodium dihydrogen phosphate was used.

(3) A metal-resin composite was prepared through the same method as described in Step (3) of Example 1, except that the resin composition prepared in Step (2) of Comparative Example 1 was used. The performance data of the prepared metal-resin composite is shown in Table 1.

Comparative Example 2

(1) A metal substrate was prepared through the same method as described in Example 1.
(2) A resin composition was prepared through the same method as described in Step (2) of Example 1, except that in the anti-yellowing agent, no pentaerythritol tetrakis-[β-dodecyl thiopropionate] was used.
(3) A metal-resin composite was prepared through the same method as described in Step (3) of Example 1, except that the resin composition prepared in Step (2) of Comparative Example 2 was used. The performance data of the prepared metal-resin composite is shown in Table 1.

Comparative Example 3

(1) A metal substrate was prepared through the same method as described in Step (1) of Example 1.
(2) A resin composition was prepared through the same method as described in Step (2) of Example 1, except that the sodium dihydrogen phosphate was replaced with an equivalent amount of tris(2,4-t-butylphenyl) phosphite.
(3) A metal-resin composite was prepared through the same method as described in Step (3) of Example 1, except that the resin composition prepared in Step (2) of Comparative Example 3 was used. The performance data of the prepared metal-resin composite is shown in Table 1.

Comparative Example 4

(1) A metal substrate was prepared through the same method as described in Step (1) of Example 1.
(2) A resin composition was prepared through the same method as described in Step (2) of Example 1, except that the pentaerythritol tetrakis-[β-dodecyl thiopropionate] was replaced by an equivalent amount of N,N'-bis-(3-(3,5-di-t-butyl-4-hydroxyphenyl) propionyl) hexamethylendiamine.
(3) A metal-resin composite was prepared through the same method as described in Step (3) of Example 1, except that the resin composition prepared in Step (2) of Comparative Example 4 was used. The performance data of the prepared metal-resin composite is shown in Table 1.

Comparative Example 5

(1) A metal substrate was prepared through the same method as described in Step (1) of Example 1.
(2) A resin composition was prepared through the same method as described in Step (2) of Example 1, except that while the amount of the anti-yellowing agent was kept unchanged, the concentration of sodium dihydrogen phosphate in the anti-yellowing agent is 100 parts by weight, relative to 100 parts by weight of pentaerythritol tetrakis-[β-dodecyl thiopropionate].
(3) A metal-resin composite was prepared through the same method as described in Step (3) of Example 1, except that the resin composition prepared in Step (2) of Comparative Example 5 was used. The performance data of the prepared metal-resin composite is shown in Table 1.

Comparative Example 6

(1) A metal substrate was prepared through the same method as described in Example 1.
(2) A resin composition was prepared through the same method as described in Step (2) of Example 1, except that no anti-yellowing agent was used.
(3) A metal-resin composite was prepared through the same method as described in Step (3) of Example 1, except that the resin composition prepared in Step (2) of Comparative Example 6 was used. The performance data of the prepared metal-resin composite is shown in Table 1.

Example 4

(1) A metal substrate was prepared through the same method as described in Step (1) of Example 1.
(2) A resin composition was prepared through the same method as described in Step (2) of Example 1, except that no bond force enhancing resin was used.
(3) A metal-resin composite was prepared through the same method as described in Step (3) of Example 1, except that the resin composition prepared in Step (2) of Example 4 was used. The performance data of the prepared metal-resin composite is shown in Table 1.

Example 5

(1) A metal substrate was prepared through the same method as described in Step (1) of Example 1.
(2) A resin composition was prepared through the same method as described in Step (2) of Example 1, except that no modified resin was used.
(3) A metal-resin composite was prepared through the same method as described in Step (3) of Example 1, except that the resin composition prepared in Step (2) of Example 5 was used. The performance data of the prepared metal-resin composite is shown in Table 1.

Example 6

(1) A metal substrate was prepared through the same method as described in Step (1) of Example 1.
(2) A resin composition was prepared through the same method as described in Step (2) of Example 1, except that no bond force enhance resin, but 2 parts by weight of GR205 resin available from Dow Chemical Company was used (which is a random copolymer of maleic anhydride with ethylene, in which the concentration of the structural unit formed by maleic anhydride is 1.8 wt %, the incipient melting temperature is 122° C., and the melting point is 130° C.).
(3) A metal-resin composite was prepared through the same method as described in Step (3) of Example 1, except that the resin composition prepared in Step (2) of Example 6 was used. The performance data of the prepared metal-resin composite is shown in Table 1.

Example 7

(1) An SUS304 stainless steel plate of 1.0 mm in thickness was cut into a rectangular plate of 100 mm long×15 mm wide, and then immersed for 2 min in 35 wt % hydrochloric acid (where the solution temperature was 50° C.). The stainless steel plate was removed, washed 3 times with deionized water, and dried to obtain a metal substrate. The surface of the metal substrate was observed under an electron microscope, and determined that corrosion holes with an average inner diameter of 150 nm were distributed on the surface of the stainless steel plate.

(2) 63 parts by weight of a polyphenylene sulfide resin (PPS-1H30C, in which the crystallization temperature is 121° C., and the glass transition temperature is 90° C.), 0.65 parts by weight of a bond force enhancing resin (GR209 available from Dow Chemical Company, which is a random copolymer of maleic anhydride with ethylene, in which the concentration of the maleic anhydride group is 1.5 wt %, the incipient melting temperature is 105° C., and the melting point is 115° C.), 2.5 parts by weight of a modified resin (Lotader AX8840 available from Arkema, which is a random copolymer of ethylene with glycidyl methacrylate, in which the concentration of the structural unit formed by glycidyl methacrylate is 4 wt %, and the melting point is 106° C.), and 1.5 parts by weight of an anti-yellowing agent (containing sodium dihydrogen phosphate and pentaerythritol tetrakis-[β-dodecyl thiopropionate], in which relative to 100 parts by weight of pentaerythritol tetrakis-[β-dodecyl thiopropionate], the concentration of sodium dihydrogen phosphate is 400 parts by weight) were mixed uniformly. Then 25.2 parts by weight of D glass fiber (D-glass available from Chongqing International Composite Materials Co., Ltd) and 0.5 part by weight of silicone as a lubricant (available from Wacker Chemie, under the trademark GENIOPLAST) were added, mixed uniformly in a twin screw extruder and then granulated by extrusion, to obtain a granular material.

The granular material was injection molded, to obtain specimens that were used in the tensile test, the notched Izod impact test, and the anti-yellowing test respectively, to determine the tensile strength, the notched Izod impact strength, and the chromaticity. The result is shown in Table 1.

(3) A melt of the granular material obtained in Step (2) was injected onto the surface of the metal substrate obtained in Step (1) by an injection molding machine, and cooled to obtain a metal-resin composite, in which the molding temperature was 110° C., the nozzle temperature was 300° C., the holding time was 2 seconds, the injection pressure was 50 MPa, the injection time was 1 second, and the delay time was 5 seconds. The formed resin layer has a size of 100 mm long×15 mm wide×1 mm thick, the metal substrate is lap joined to the resin layer at a site of 5 mm long×15 mm wide. The performance data of the metal-resin composite is shown in Table 1.

Example 8

(1) A metal substrate was prepared through the same method as described in Step (7) of Example 1.

(2) A resin composition was prepared through the same method as described in Step (2) of Example 7, except that while the amount of the anti-yellowing agent was kept unchanged, the concentration of sodium dihydrogen phosphate in the anti-yellowing agent is 100 parts by weight relative to 100 parts by weight of pentaerythritol tetrakis-[β-dodecyl thiopropionate].

(3) A metal-resin composite was prepared through the same method as described in Step (3) of Example 7, except that the resin composition prepared in Step (2) of Example 8 was used. The performance data of the prepared metal-resin composite is shown in Table 1.

TABLE 1

| No. | Average shear strength/ MPa | Notched impact strength/J/m | Chromaticity $b_1$ | Chromaticity $\Delta b^*$ |
|---|---|---|---|---|
| Example 1 | 22 | 160 | 2.0 | 0.4 |
| Example 2 | 22 | 155 | 2.5 | 0.8 |
| Example 3 | 22 | 160 | 2.7 | 0.6 |
| Comparative Example 1 | 22 | 150 | 4.2 | 2.0 |
| Comparative Example 2 | 21 | 120 | 2.5 | 1.2 |
| Comparative Example 3 | 22 | 160 | 3.3 | 1.5 |
| Comparative Example 4 | 22 | 145 | 2.5 | 1.1 |
| Comparative Example 5 | 21 | 120 | 2.4 | 1.0 |
| Comparative Example 6 | 22 | 150 | 6.5 | 3.3 |
| Example 4 | 16 | 160 | 2.1 | 0.4 |
| Example 5 | 22 | 90 | 2.1 | 0.4 |
| Example 6 | 18 | 160 | 2.1 | 0.6 |
| Example 7 | 21 | 130 | 2.0 | 0.35 |
| Example 8 | 21 | 130 | 2.2 | 0.72 |

*$\Delta b = b_2 - b_1$, where $b_1$ is the b value of the specimen before baking; and $b_2$ is the b value of the specimen determined after being baked at 180° C. for 3 hrs.

As can be seen from the comparison of Example 1 with Comparative Examples 1-6, the b value before baking of the resin layer with the anti-yellowing composition according to the present disclosure is small, suggesting that the resin layer itself is not yellowish; and after baking at 180° C. for 3 hrs, the $\Delta b$ is less than 1, suggesting that the resin layer has a good anti-yellowing performance.

As can be seen from the comparison of Example 1 with Examples 4 and 6, the average shear strength (that is, bond strength) between the metal substrate and the resin layer in the metal-resin composite can be further enhanced by introducing a bond force enhancing resin in the resin composition, thus increasing the structure stability of the metal-resin composite.

As can be seen from the comparison of Example 1 with Example 5, the impact resistance of the resin layer in the metal-resin composite can be further increased by introducing a modified resin in the resin composition.

What is claimed is:

1. An anti-yellowing composition, comprising at least a phosphorus-containing compound and at least a pentaerythritol ester, wherein the phosphorus-containing compound is a phosphate salt, the pentaerythritol ester includes a sulfur-containing pentaerythritol ester type antioxidant, and a concentration of the phosphorus-containing compound is 100-1600 parts by weight, relative to 100 parts by weight of the pentaerythritol ester.

2. The anti-yellowing composition according to claim 1, wherein the phosphate salt is a compound of Formula I:

$M_xH_yPO_4$ (Formula I)

where in Formula I, M is an alkali metal or an alkaline earth metal atom, x is an integer from 1 to 3, y is an integer from 0 to 2, and x+y=3.

3. The anti-yellowing composition according to claim 1, wherein the phosphate salt is at least one of sodium dihydrogen phosphate, disodium hydrogen phosphate, and trisodium phosphate.

4. The anti-yellowing composition according to claim 1, wherein the pentaerythritol ester is selected from a pentaerythritol ester type antioxidant.

5. The anti-yellowing composition according to claim 1, wherein the pentaerythritol ester includes at least one of pentaerythritol tetrakis-[β-dodecyl thiopropionate] and bis(2,6-di-t-butyl-4-methylphenyl)pentaerythritol diphosphate.

6. The anti-yellowing composition according to claim 1, wherein a concentration of the phosphorus-containing compound is 400-1600 parts by weight, relative to 100 parts by weight of the pentaerythritol ester.

7. A resin composition, comprising:
a base resin;
an anti-yellowing agent, comprising at least a phosphorus-containing compound and at least a pentaerythritol ester, wherein the phosphorus-containing compound is selected from a phosphate salt, and a concentration of the phosphorus-containing compound is 100-1600 parts by weight, relative to 100 parts by weight of the pentaerythritol ester; and
at least a bond force enhancing resin, wherein an incipient melting temperature of the bond force enhancing resin is not higher than a crystallization temperature of the base resin, and a concentration of the bond force enhancing resin is 1-5 parts by weight relative to 100 parts by weight of the base resin.

8. The resin composition according to claim 7, wherein a concentration of the anti-yellowing agent is 0.1-5 parts by weight relative to 100 parts by weight of the base resin.

9. The resin composition according to claim 7, wherein the incipient melting temperature of the bond force enhancing resin is 10-20° C. lower than the crystallization temperature of the base resin.

10. The resin composition according to claim 7, wherein the bond force enhancing resin is a polyolefin having a structural unit containing a maleic anhydride group, and a concentration of the structural unit containing a maleic anhydride group in the bond force enhancing resin is 0.5-2 wt %.

11. The resin composition according to claim 7, further comprising a fiber, wherein a concentration of the fiber is 10-60 parts by weight relative to 100 parts by weight of the base resin.

12. The resin composition according to claim 7, further comprising at least a modified resin, wherein a melting point of the modified resin is 3-24° C. higher than a glass transition temperature of the base resin, and a concentration of the modified resin is 1-10 parts by weight relative to 100 parts by weight of the base resin.

13. The resin composition according to claim 12, wherein the modified resin includes a polyolefin having an epoxy group-containing structural unit, and a concentration of the epoxy group-containing structural unit in the modified resin is 1-8 wt %.

14. The resin composition according to claim 12, wherein the modified resin has a structural unit formed by an olefin and an epoxy group-containing structural unit of Formula II:

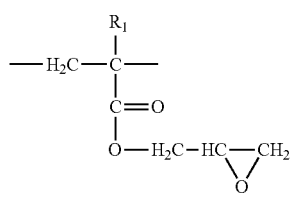

(Formula II)

wherein in Formula I, $R_1$ is hydrogen or $C_1$-$C_5$ alkyl; or
the modified resin has a structural unit formed by ethylene and an epoxy group-containing structural unit of Formula III:

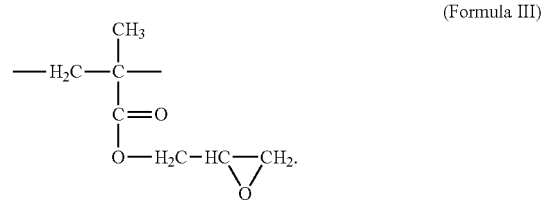

(Formula III)

15. The resin composition according to claim 7, wherein the base resin is at least one of a polyphenylene ether resin, a polyphenylene sulfide resin, and a polyalkylene terephthalate.

16. A method for preparing a metal-resin composite, comprising:
uniformly mixing a resin composition;
injecting the resin composition onto a surface of a metal substrate; and
molding the resin composition to form a resin layer on the surface of the metal substrate, wherein the resin composition comprises a base resin and an anti-yellowing agent, the anti-yellowing agent comprises at least a phosphorus-containing compound and at least a pentaerythritol ester, the phosphorus-containing compound is a phosphate salt, and a concentration of the phosphorus-containing compound is 100-1600 parts by weight, relative to 100 parts by weight of the pentaerythritol ester.

17. The method according to claim 16, wherein the metal substrate is a metal substrate experiencing a surface treatment, and the surface treatment comprises anodizing the metal substrate and positioning the metal substrate in an etching solution for etching the surface of the metal substrate.

18. An electronic product shell, comprising a metal shell body and at least one resin member attached to at least part of an inner surface and/or at least part of an outer surface of the metal shell body, wherein the resin member is formed with a resin composition;
the resin composition comprising:
a base resin; and
an anti-yellowing agent, comprising at least a phosphorus-containing compound comprising a phosphate salt and at least a pentaerythritol ester, a concentration of the phosphorus-containing compound being 100-1600 parts by weight, relative to 100 parts by weight of the pentaerythritol ester.

* * * * *